United States Patent
Olubummo et al.

(10) Patent No.: US 11,008,479 B2
(45) Date of Patent: May 18, 2021

(54) FUSING AGENT INCLUDING A TETRAPHENYLDIAMINE-BASED DYE

(71) Applicant: HEWLETT-PACKARD DEVELOPMENT COMPANY, L.P., Houston, TX (US)

(72) Inventors: Paul Olubummo, Palo Alto, CA (US); Lihua Zhao, Palo Alto, CA (US); Kristopher J. Erickson, Palo Alto, CA (US); Howard S. Tom, Palo Alto, CA (US); Aja Hartman, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 337 days.

(21) Appl. No.: 16/076,918

(22) PCT Filed: Feb. 6, 2017

(86) PCT No.: PCT/US2017/016674
§ 371 (c)(1),
(2) Date: Aug. 9, 2018

(87) PCT Pub. No.: WO2018/144031
PCT Pub. Date: Aug. 9, 2018

(65) Prior Publication Data
US 2019/0048219 A1 Feb. 14, 2019

(51) Int. Cl.
*C09D 11/54* (2014.01)
*B33Y 10/00* (2015.01)
(Continued)

(52) U.S. Cl.
CPC ............ *C09D 11/54* (2013.01); *B29C 64/112* (2017.08); *B29C 64/165* (2017.08); *B29C 64/20* (2017.08);
(Continued)

(58) Field of Classification Search
None
See application file for complete search history.

(56) References Cited

U.S. PATENT DOCUMENTS

| | | |
|---|---|---|
| 6,149,719 A | 11/2000 | Houle |
| 2012/0125216 A1 | 5/2012 | Levanon et al. |

(Continued)

FOREIGN PATENT DOCUMENTS

| | | |
|---|---|---|
| EP | 0735120 A2 | 10/1996 |
| WO | 2013044991 A1 | 4/2013 |

(Continued)

*Primary Examiner* — Nahida Sultana
*Assistant Examiner* — Manley L Cummins, IV
(74) *Attorney, Agent, or Firm* — Dierker & Kavanaugh PC (57) ABSTRACT

An example of a fusing agent includes a tetraphenyldiamine-based dye, alkyldiphenyloxide disulfonate, 1-methyl-2-pyrrolidone, and a balance of water. The fusing agent excludes a strong reducing species. The fusing agent may be incorporated into a three-dimensional printing method or a three-dimensional printing system. In an example of the three-dimensional printing method, a polymeric or polymeric composite build material is applied. The fusing agent is selectively applied on at least a portion of the polymeric or polymeric composite build material. The polymeric or polymeric composite build material is exposed to electromagnetic radiation to fuse the portion of the polymeric or polymeric composite build material in contact with the fusing agent to form a layer.

15 Claims, 5 Drawing Sheets

(51) Int. Cl.
*B33Y 30/00* (2015.01)
*B29C 64/165* (2017.01)
*B29C 64/393* (2017.01)
*C09D 11/033* (2014.01)
*C09D 11/037* (2014.01)
*C09D 11/30* (2014.01)
*B33Y 50/02* (2015.01)
*B33Y 70/00* (2020.01)
*B29C 64/112* (2017.01)
*B29C 64/20* (2017.01)
*C09D 11/101* (2014.01)
*C09D 11/102* (2014.01)
*C09D 11/328* (2014.01)
*C09D 11/38* (2014.01)

(52) U.S. Cl.
CPC ............ *B29C 64/393* (2017.08); *B33Y 10/00* (2014.12); *B33Y 30/00* (2014.12); *B33Y 50/02* (2014.12); *B33Y 70/00* (2014.12); *C09D 11/033* (2013.01); *C09D 11/037* (2013.01); *C09D 11/101* (2013.01); *C09D 11/102* (2013.01); *C09D 11/30* (2013.01); *C09D 11/328* (2013.01); *C09D 11/38* (2013.01)

(56) References Cited

U.S. PATENT DOCUMENTS

| | | |
|---|---|---|
| 2012/0129095 A1 | 5/2012 | Levanon et al. |
| 2017/0239889 A1* | 8/2017 | Ganapathiappan .. C09D 11/322 |
| 2017/0247553 A1* | 8/2017 | Ganapathiappan .... B33Y 70/00 |
| 2018/0273720 A1* | 9/2018 | Huang ................. B29C 64/165 |

FOREIGN PATENT DOCUMENTS

| | | |
|---|---|---|
| WO | 2015108544 A1 | 7/2015 |
| WO | 2016048380 A1 | 3/2016 |
| WO | 2016068899 A1 | 5/2016 |

* cited by examiner

FUSING AGENT INCLUDING A TETRAPHENYLDIAMINE-BASED DYE

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method and the 3D printing system disclosed herein utilize Multi Jet Fusion (MJF). During MJF, an entire layer of a build material (also referred to as build material particles) is exposed to radiation, but a selected region (in some instances less than the entire layer) of the build material is fused and hardened to become a layer of a 3D part. A fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D part.

As used herein, the terms "3D printed part," "3D part," or "part" may be a completed 3D printed part or a layer of a 3D printed part.

Some fusing agents used in MJF tend to have significant absorption (e.g., 80%) in the visible region (400 nm-780 nm). This absorption generates heat suitable for fusing during 3D printing, which leads to 3D parts having mechanical integrity and relatively uniform mechanical properties (e.g., strength, elongation at break, etc.). This absorption, however, results in strongly colored, e.g., black, 3D parts. In some instances, it may not be desirable to generate strongly colored parts. Rather, it may be desirable to generate a part that is white, off-white, or some color other than black.

Examples of the fusing agent disclosed herein, which may be utilized in examples of the method and system disclosed herein, contain a tetraphenyldiamine-based dye, which has absorption at wavelengths ranging from 800 nm to 1200 nm. The tetraphenyldiamine-based dye, and the fusing agent including the dye, is capable of absorbing at least 80% of radiation having wavelengths ranging from 800 nm to 1200 nm. Like the visible region absorbing fusing agents, the absorption of the fusing agents including the tetraphenyldiamine-based dye generates heat suitable for fusing polymeric or polymeric composite build material in contact therewith during 3D printing, which leads to 3D parts having mechanical integrity and relatively uniform mechanical properties (e.g., strength, elongation at break, etc.).

In addition to fusing the polymeric or polymeric composite build material, the applied radiation also initiates discoloration of the tetraphenyldiamine-based dye. As used herein, the terms "discoloration," "discolor," and "discolored" refer to the loss of color of the tetraphenyldiamine-based dye due to its reduction. When the discoloration of the tetraphenyldiamine-based dye is complete, the tetraphenyldiamine-based dye may be at least substantially colorless. By "at least substantially colorless," it is meant that the original color of the dye changes or fades to a point that the formed part exhibits a color of the build material, a color of a colorant present in the fusing agent, or a color of a colorant subsequently applied to the part. Thus, the fusing agent, containing the tetraphenyldiamine-based dye, may be used to print white 3D parts, off-white 3D parts, or colored parts.

As mentioned above, the discoloration of the dye may be due to its reduction. While not being bound to any theory, it is believed that the tetraphenyldiamine-based dye may be at least partially reduced to an at least substantially colorless form due to the heat generated during fusing, to the component(s) of the fusing agent (e.g., a mild/weak reducing species, which reduces the dye, but not to its leuco form, and thus enables the dye to retain its optical absorption of the desired wavelengths), to the component(s) of a reducing agent that is applied to the 3D part after it is formed (e.g., a strong reducing species, i.e., an agent that can reduce the dye to its leuco form and render the dye non-absorbing of wavelengths ranging from 800 nm to 1200 nm), to the polymeric or polymeric composite build material, or a combination thereof.

It has been found that when the tetraphenyldiamine-based dye is contained in a fusing agent that includes a strong reducing species (i.e., an agent that can reduce the dye to its leuco form and render the dye non-absorbing of wavelengths ranging from 800 nm to 1200 nm), the tetraphenyldiamine-based dye will be reduced to the non-absorbing form prior to fusing the build material. When in the non-absorbing form, the tetraphenyldiamine-based dye has transparency at or is non-absorbing of wavelengths ranging from 800 nm to 1200 nm. As used herein "transparency" and "non-absorbing" mean that 20% or less of radiation having wavelengths ranging from 800 nm to 1200 nm is absorbed. This transparency or non-absorbance deleteriously impacts the ability of the fusing agent to absorb enough radiation to fuse the build material in contact therewith. Thus, examples of the fusing agent disclosed herein may exclude strong reducing species (examples of which include 2-pyrrolidone and/or polyacrylates, such as CARBOSPERSE® K7028). Mild or weaker reducing species, such as 1-methyl-2-pyrrolidone, may be used in the examples of the fusing agent disclosed herein.

As such, examples of the fusing agent disclosed herein may also include 1-methyl-2-pyrrolidone (as a mild/weak reducing species) and/or exclude 2-pyrrolidone and/or polyacrylates (as strong reducing species).

After the polymeric or polymeric composite build material has been fused, the tetraphenyldiamine-based dye may be photo-oxidized by ambient light, which may cause the tetraphenyldiamine-based dye to become green rather than colorless. Examples of the method and system disclosed herein may utilize and include a reducing agent, such as sodium borohydride, 2-pyrrolidone, sodium hydrosulfite, or thiourea dioxide, to prevent a 3D printed part from turning green, or some other undesirable color as a result of photo-oxidation. In some examples of the method, the reducing agent is applied to the 3D part formed in the 3D printing method using examples of the fusing agent disclosed herein.

The fusing agent disclosed herein generally includes a liquid vehicle and the tetraphenyldiamine-based dye. The tetraphenyldiamine-based dye allows the fusing agent to absorb radiation at wavelengths ranging from 800 nm to 1200 nm, which enables the fusing agent to convert enough radiation to thermal energy so that the polymeric or polymeric composite build material particles fuse. An example of a suitable tetraphenyldiamine-based dye is tetraphenyldiamine dye or a substituted tetraphenyldiamine dye (e.g., substituted with an alkyl group, an aromatic group, or any other group that shifts the absorbance further into the infrared region or that does not shift the absorbance in an undesirable manner).

The amount of the tetraphenyldiamine-based dye that is present in the fusing agent may range from about 0.5 wt % to about 10 wt % based on the total wt % of the fusing agent. In an example, the amount of the tetraphenyldiamine-based dye present in the fusing agent ranges from about 1 wt % to about 3 wt % based on the total wt % of the fusing agent. In another example, the amount of the tetraphenyldiamine-based dye present in the fusing agent is about 3 wt % based on the total wt % of the fusing agent. It is believed that these tetraphenyldiamine-based dye loadings provide a balance between the fusing agent having jetting reliability and electromagnetic radiation absorbance efficiency.

As mentioned above, a strong reducing species may cause the tetraphenyldiamine-based dye to reduce to its leuco form. The reduction of the tetraphenyldiamine-based dye by the reducing species may be according to equation I:

(I)

When the tetraphenyldiamine-based dye is reduced to its leuco form (right side of equation I), the tetraphenyldiamine-based dye has transparency or non-absorbency in the near-infrared (NIR) region (e.g., at wavelengths ranging from 800 nm to 1200 nm) because of the break in conjugation. Thus, the use of strong reducing species in the fusing agent may reduce the absorption of the tetraphenyldiamine-based dye in the NIR region and deleteriously affect the ability of the fusing agent to absorb applied radiation and generate heat to fuse a layer of the polymeric or polymeric composite build material particles.

As an example of the strong reducing species, 2-pyrrolidone may undergo hydrolysis according to equation/scheme II:

(II)

The hydrogen atom that is released from the nitrogen during the hydrolysis of 2-pyrrolidone can act as a proton and reduce the tetraphenyldiamine-based dye to its leuco form.

Because the presence of strong reducing species in the fusing agent may deleteriously affect the ability of the fusing agent to absorb applied radiation and generate heat to fuse a layer of the polymeric or polymeric composite build material particles, some examples of the fusing agent disclosed herein exclude strong reducing species. As mentioned above, the strong reducing species may be any agent that is capable of reducing the tetraphenyldiamine-based dye to its leuco form and rendering the dye non-absorbing of wavelengths ranging from 800 nm to 1200 nm. In addition to 2-pyrrolidone, examples of the fusing agent may exclude other strong reducing species, such as polyacrylates.

As used herein, "FA vehicle" may refer to the liquid fluid in which the tetraphenyldiamine-based dye is placed to form the fusing agent. A wide variety of FA vehicles may be used with the fusing agent, method, and system of the present disclosure. The FA vehicle may include water, alone or in combination with a mixture of a variety of additional components. Examples of these additional components may include co-solvent(s), scale inhibitor(s), anti-deceleration agent(s), surfactant(s), emulsifier(s), chelating agent(s), and/or antimicrobial agent(s).

The aqueous nature of the fusing agent enables the fusing agent to penetrate, at least partially, into the layer of the polymeric or polymeric composite build material particles. The build material particles may be hydrophobic, and the presence of the co-solvent and/or the surfactant in the fusing agent may assist in obtaining a particular wetting behavior.

One example FA vehicle includes water, 1-methyl-2-pyrrolidone, and alkyldiphenyloxide disulfonate. Another example FA vehicle consists of water, 1-methyl-2-pyrrolidone, and alkyldiphenyloxide disulfonate. Some example FA vehicles exclude strong reducing species. Other example FA vehicles exclude 2-pyrrolidone and/or polyacrylates.

The FA vehicle may include a co-solvent present, in total in the fusing agent, in an amount ranging from about 5 wt % to about 50 wt % (based on the total wt % of the fusing agent), depending, at least in part, on the jetting architecture that is to be used to dispense the fusing agent. In an example, the co-solvent is present in the fusing agent in an amount of about 40 wt % based on the total wt % of the fusing agent. It is to be understood that other amounts outside of this example and range may also be used.

In an example, the co-solvent is a mild/weak reducing species. In another example, the co-solvent is not a reducing species at all. One example of a suitable co-solvent is 1-methyl-2-pyrrolidone. Other examples of suitable co-solvents include 1-(2-hydroxyethyl)-2-pyrrolidone and/or ethylene glycol.

The fusing agent may include scale inhibitor(s) or anti-deceleration agent(s). One suitable scale inhibitor/anti-deceleration agent is an alkyldiphenyloxide disulfonate (e.g., DOWFAX™ 8390 and DOWFAX™ 2A1 from The Dow Chemical Company).

The scale inhibitor(s)/anti-deceleration agent(s) may be present in the fusing agent in an amount ranging from about 0.05 wt % to about 5 wt % of the total wt % of the fusing agent. In an example, the scale inhibitor/anti-deceleration agent is present in the fusing agent in an amount of about 0.2 wt % based on the total wt % of the fusing agent.

Surfactant(s) may also be used in the FA vehicle to improve the wetting properties of the fusing agent and/or to reduce surface tension. Examples of suitable surfactants include non-ionic surfactants. Some specific examples include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be desirable to utilize a surfactant having a hydrophilic-lipophilic balance (HLB) less than 10.

Whether a single surfactant is used or a combination of surfactants is used, the total amount of surfactant(s) in the fusing agent may range from about 0.1 wt % to about 4 wt % based on the total wt % of the fusing agent. In an example, the surfactant acts as a wetting agent and is present in the fusing agent in an amount of about 0.1 wt % (based on the total wt % of the fusing agent). In another example, the surfactant acts as a surface tension reduction agent and is present in the fusing agent in an amount of about 1.5 wt % (based on the total wt % of the fusing agent). In some instances, the surfactant acts as both a wetting agent and a surface tension reduction agent, and any of the previously described amounts may be used.

Emulsifier(s) may also be included in the FA vehicle. Examples of suitable emulsifiers include oleth-3-phosphate (commercially available as CRODAFOST™ O3A or CRODAFOS™ N-3 acid) or dextran 500 k. Other suitable examples of the emulsifiers include CRODAFOS™ HCE (phosphate-ester from Croda Int.), CRODAFOS® N10 (oleth-10-phosphate from Croda Int.), etc.

The emulsifier(s) may be present in the fusing agent in an amount ranging from about 0.1 wt % to about 2 wt % of the total wt % of the fusing agent. In an example, the amount of the emulsifier(s) present in the fusing agent is about 1 wt % (based on the total wt % of the fusing agent).

The fusing agent may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.)

Whether a single chelating agent is used or a combination of chelating agents is used, the total amount of chelating agent(s) in the fusing agent may range from 0 wt % to about 2 wt % based on the total wt % of the fusing agent. In an example, the chelating agent is present in the fusing agent in an amount of about 0.08 wt % (based on the total wt % of the fusing agent).

The FA vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the fusing agent may include a total amount of antimicrobial agents that ranges from about 0.1 wt % to about 0.25 wt %. In an example, the antimicrobial agent is a biocide and is present in the fusing agent in an amount of about 0.22 wt % (based on the total wt % of the fusing agent).

The balance of the fusing agent is water.

In an example, the fusing agent includes from about 0.5 wt % to about 10 wt % of the tetraphenyldiamine-based dye, from about 0.05 wt % to about 5 wt % of alkyldiphenyloxide disulfonate, from about 5 wt % to about 50 wt % of 1-methyl-2-pyrrolidone, and a balance of water (based on the total wt % of the fusing agent).

In some examples, the fusing agent may include a colorant in addition to the tetraphenyldiamine-based dye. While the tetraphenyldiamine-based dye functions as an electromagnetic radiation absorber and becomes colorless after fusing the build material, the additional colorant may impart color to the fusing agent and the resulting 3D part. The amount of the colorant that may be present in the fusing agent ranges from about 1 wt % to about 10 wt % based on the total wt % of the fusing agent. The colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74).

In some other examples, the fusing agent excludes a colorant other than the tetraphenyldiamine-based dye. It may be desirable to exclude the colorant from the fusing agent when the 3D part to be created is to be the color of the polymeric or polymeric composite build material (e.g., white or off-white) or when a colored ink will be applied to the 3D part.

Figure 1:
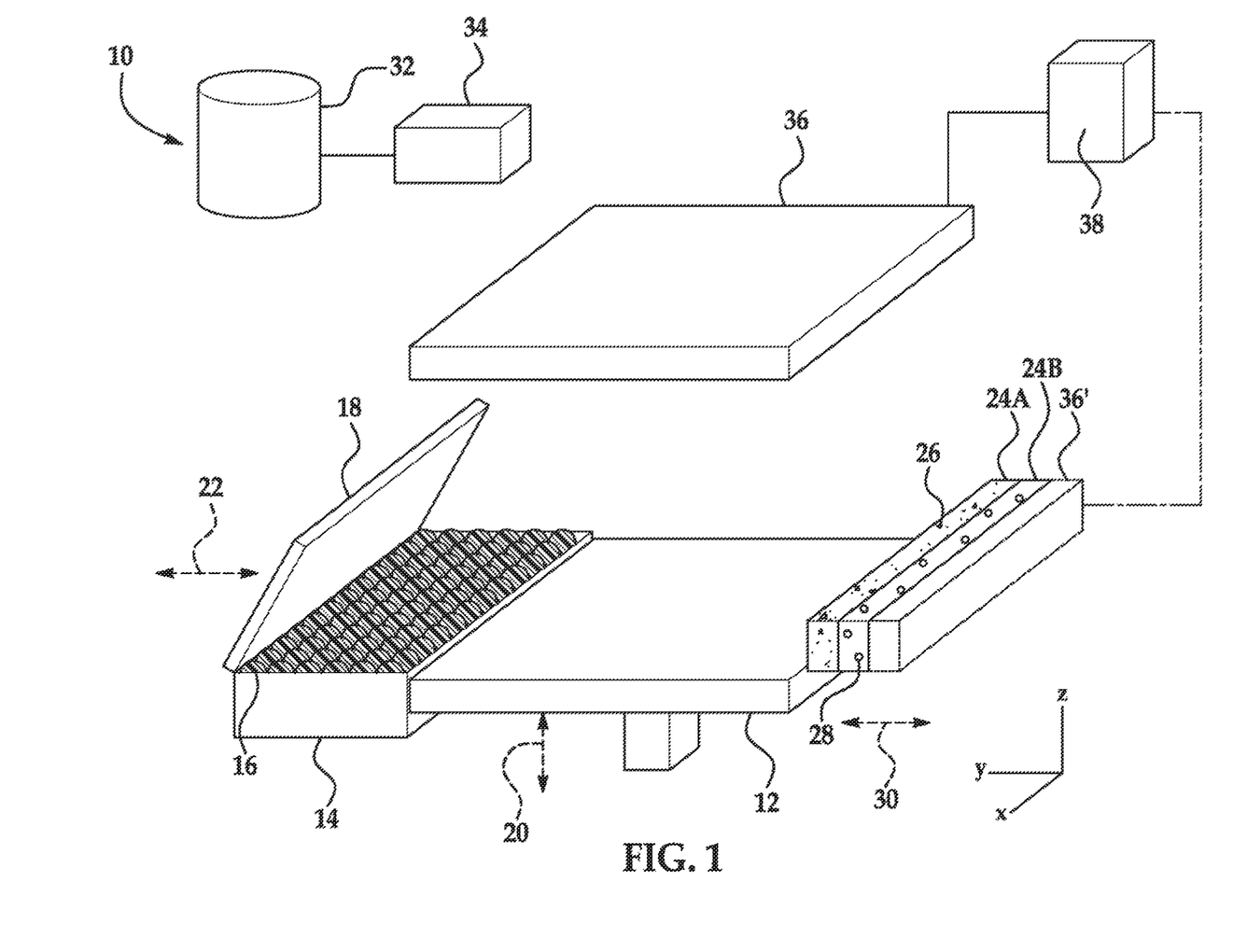
FIG. 1 is a simplified isometric and schematic view of an example of a 3D printing system disclosed herein.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing polymeric or polymeric composite build material particles 16, and a build material distributor 18.

The build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 2A:
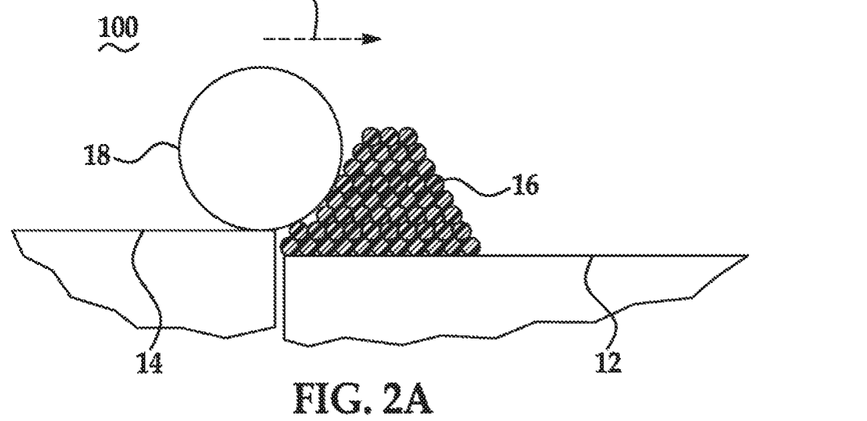
FIGS. 2A through 2E are schematic and partially cross-sectional views depicting the formation of a 3D part using examples of a 3D printing method disclosed herein.
Figure 2B:
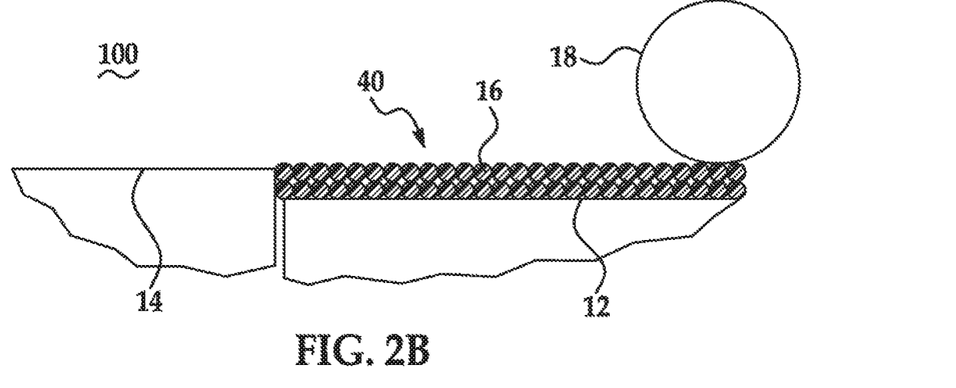
Figure 2C:
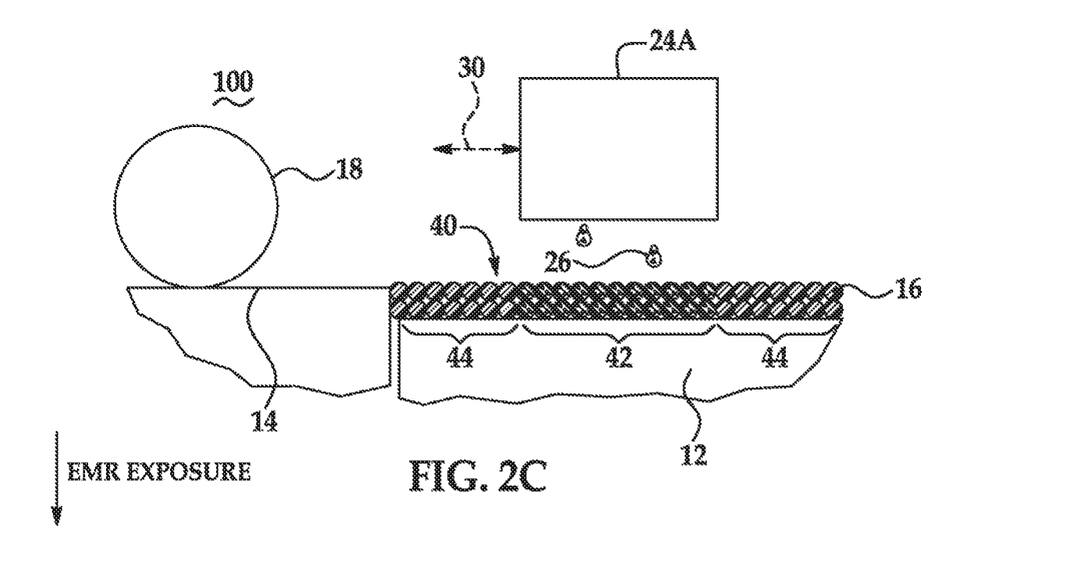
Figure 2D:
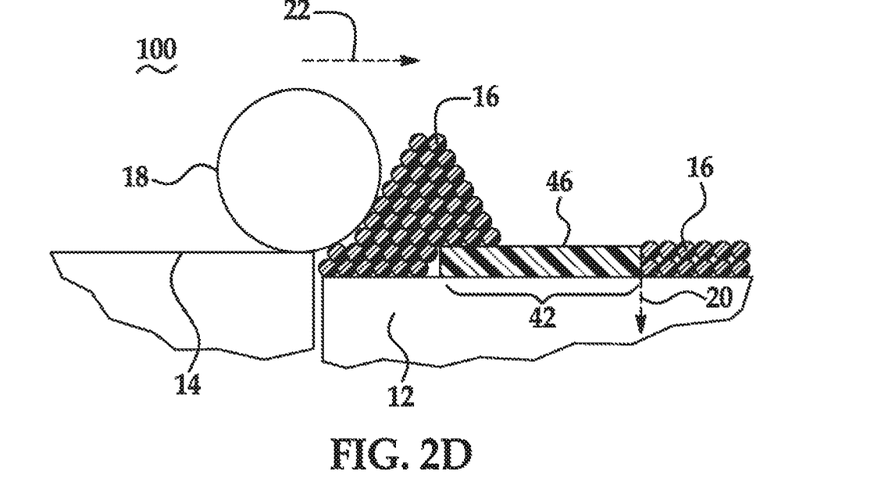
Figure 2E:
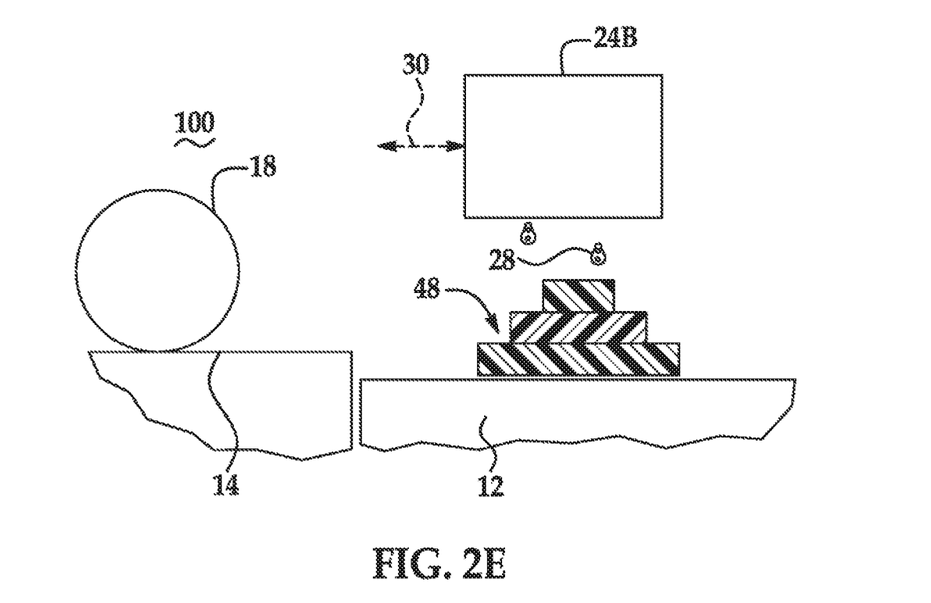

The build area platform 12 may be moved in a direction as denoted by the arrow 20, e.g., along the z-axis, so that polymeric or polymeric composite build material 16 may be delivered to the platform 12 or to a previously formed layer of the 3D part 48 (see, e.g., FIG. 2E). In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the platform 12 to form a substantially uniform layer of the polymeric or polymeric composite build material 16 thereon (see, e.g., FIGS. 2A and 2B). The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12. In some examples, the build material supply 14 may include a surface upon which the polymeric or polymeric composite build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric or polymeric composite build material particles 16 from a storage location to a position to be spread onto the build area platform 12 or onto a previously formed layer of the 3D part 48.

The build material distributor 18 may be moved in a direction as denoted by the arrow 22, e.g., along the y-axis, over the build material supply 14 and across the build area platform 12 to spread a layer of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

The polymeric or polymeric composite build material particles 16 may be a polymeric build material or a polymeric composite build material. As used herein, the term "polymeric build material" may refer to crystalline or semi-crystalline polymer particles. As used herein, the term "polymeric composite build material" may refer or composite particles made up of polymer and ceramic. Any of the polymeric or polymeric composite build material particles 16 may be in powder form.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11 PA 12/nylon 12, PA 6/nylon 6, PA 8/nylon 8, PA 9/nylon 9, PA 66/nylon 66, PA 612/nylon 612. PA 812/nylon 812, PA 912/nylon 912, etc.). Other examples of crystalline or semi-crystalline polymers suitable for use as the build material particles 16 include polyethylene, polypropylene, and polyoxomethylene polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon niononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part 48 (see, e.g., FIG. 2E) to be formed. In one example, the ceramic particles may be present in an amount ranging from about 1 wt % to about 20 wt % based on the total wt % of the polymeric composite build material particles 16.

The polymeric or polymeric composite build material particles 16 may have a melting point or softening point ranging from about 50° C. to about 400° C. As an example, the build material particles 16 may be a polyamide having a melting point of 180° C.

The polymeric or polymeric composite build material particles 16 may be made up of similarly sized particles or differently sized particles. The term "size", as used herein with regard to the polymeric or polymeric composite build material particles 16, refers to the diameter of a spherical particle, or the average diameter of a non-spherical particle (i.e., the average of multiple diameters across the particle), or the volume-weighted mean diameter of a particle distribution. In an example, the average size of the polymeric or polymeric composite build material particles 16 ranges from 5 μm to about 200 μm.

It is to be understood that the polymeric or polymeric composite build material 16 may include, in addition to polymeric or polymeric composite particles, a charging agent, a flow aid, or combinations thereof.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the polymeric or polymeric composite build material 16.

Flow aid(s) may be added to improve the coating flowability of the polymeric or polymeric composite build material 16. Flow aid(s) may be particularly beneficial when the particles of the polymeric or polymeric composite build material 16 are less than 25 µm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the polymeric or polymeric composite build material 16.

As shown in FIG. 1, the printing system 10 also includes a first inkjet applicator 24A, which may contain the fusing agent 26 disclosed herein.

As mentioned above, the fusing agent 26 may include the tetraphenyldiamine-based dye and the FA vehicle. In an example, the fusing agent 26 includes the tetraphenyldiamine-based dye, alkyldiphenyloxide disulfonate, 1-methyl-2-pyrrolidone, and a balance of water. In another example, the fusing agent 26 consists of these components and no other components. In still another example, the fusing agent 26 includes from about 0.5 wt % to about 10 wt % of the tetraphenyldiamine-based dye, from about 0.05 wt % to about 5 wt % of alkyldiphenyloxide disulfonate, from about 5 wt % to about 50 wt % of 1-methyl-2-pyrrolidone, and a balance of water (based on the total wt % of the fusing agent 26). As also mentioned above, in some examples, the fusing agent 26 includes the colorant. In an example, the fusing agent 26 consists of the tetraphenyldiamine-based dye, alkyldiphenyloxide disulfonate, 1-methyl-2-pyrrolidone, the colorant, and a balance of water. In another example, the fusing agent 26 excludes strong reducing species. In still another example, the fusing agent 26 excludes 2-pyrrolidone and/or polyacrylates. In still other examples, the fusing agent 26 excludes the colorant.

As depicted in FIG. 1, some examples of the printing system 10 may include a second inkjet applicator 24B. In one example, the printing system 10 includes the second inkjet applicator 24B, which may contain a reducing agent 28, in addition to the first inkjet applicator 24A.

After fusing the polymeric or polymeric composite build material particles 16, the tetraphenyldiamine-based dye is reduced and becomes colorless, which enables the 3D part to be white, or off-white, or the color of the colorant if the colorant is included in the fusing agent 26. However, the tetraphenyldiamine-based dye may undergo photo-oxidation in ambient light according to equation/scheme III:

(III)

The photo-oxidation of the tetraphenyldiamine-based dye may cause the tetraphenyldiamine-based dye, and therefore the printed part 48, to become green. Thus, in some examples, the reducing agent 28 may be applied to a printed part 48 to prevent the photo-oxidation of the tetraphenyldiamine-based dye and to prevent the print part 48 from turning green.

The reducing agent 28 includes a reducing species. In some examples, the reducing agent 28 consists of the reducing species with no other components. The reducing agent 28 may consist of the reducing species when reducing species is jettable without a vehicle or when the reducing species is to be applied by a mechanism other than the second inkjet applicator 24B. In other examples, the reducing agent 28 includes a liquid vehicle in addition to the reducing species.

The reducing species in the reducing agent 28 is capable of reducing the tetraphenyldiamine-based dye. Examples of suitable reducing species include sodium borohydride, 2-pyrrolidone, sodium hydrosulfite, thiourea dioxide, and combinations thereof.

The reducing species is present in the reducing agent 28 in an amount ranging from about 2 wt % to 100 wt % based on the total wt % of the reducing agent 28. When the reducing agent 28 is to be applied with the second inkjet applicator 24B, the reducing species loading may be selected to provide a balance between the reducing agent 28 having jetting reliability and reducing efficiency.

As used herein, "RA vehicle" may refer to the liquid fluid in which the reducing species is placed to form the reducing agent 28. A wide variety of RA vehicles may be used with the reducing agent 28. In an example, the RA vehicle is an aqueous vehicle.

The components of the RA vehicle may be similar to and included in similar amount(s) to the co-solvent(s), scale inhibitor(s), anti-deceleration agent(s), surfactant(s), emulsifier(s), chelating agent(s), and/or antimicrobial agent(s) described herein in reference to the fusing agent 26.

The inkjet applicator(s) 24A, 24B may be scanned across the build area platform 12 in the direction indicated by the arrow 30, e.g., along the y-axis. The inkjet applicator(s) 24A, 24B may be, for instance, a thermal inkjet printhead, a piezoelectric printhead, a continuous inkjet printhead, etc., and may extend a width of the build area platform 12. While each of the inkjet applicator(s) 24A, 24B is shown in FIG. 1 as a single applicator, it is to be understood that each of the inkjet applicator(s) 24A, 24B may include multiple inkjet applicators that span the width of the build area platform 12. Additionally, the inkjet applicator(s) 24A, 24B may be positioned in multiple printbars. The inkjet applicator(s) 24A, 24B may also be scanned along the x-axis, for instance, in configurations in which the inkjet applicator(s) 24A, 24B does/do not span the width of the build area platform 12 to enable the inkjet applicator(s) 24A, 24B to respectively deposit the fusing agent 26 over a large area of a layer of polymeric or polymeric composite build material particles 16 and/or deposit the reducing agent 2 over a large area of a 3D printed part 48 (see, e.g., FIG. 2E). The inkjet applicator(s) 24A, 24B may thus be attached to a moving XY stage or a translational carriage (neither of which is shown) that moves the inkjet applicator(s) 24A, 24B adjacent to the build area platform 12 in order to deposit the fusing agent 26 in predetermined areas of a layer of the polymeric or polymeric composite build material particles 16 that has been formed on the build area platform 12 in accordance with the method(s) disclosed herein and/or to deposit the reducing agent 28 on predetermined areas of a 3D printed part 48. The inkjet applicator(s) 24A, 24B may include a plurality of nozzles (not shown) through which the fluids 26, 28 are to be respectively ejected.

The inkjet applicators 24A, 24B may respectively deliver drops of the fusing agent 26 and the reducing agent 28 at a resolution ranging from about 300 dots per inch (DPI) to about 1200 DPI. In other examples, the applicator(s) 24A, 24B may deliver drops of the respective fluids 26, 28 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, inkjet applicators 24A, 24B are able to deliver variable size drops of the fluids 26, 28, respectively.

In some examples of the system 10 disclosed herein, another applicator (not shown) may be included that is capable of applying a colored ink to the printed part 48 that is formed. This applicator may be similar to or the same as applicator 24. It may be desirable to include this applicator and the colored ink when the 3D part is the color of the polymeric or polymeric composite build material (e.g., white or off-white), and when it is desirable to apply color to the white or off-white 3D part.

An example of a pigment based colored ink may include from about 1 wt % to about 10 wt % of pigment(s), from about 10 wt % to about 30 wt % of co-solvent(s), from about 0.5 wt % to about 2 wt % of dispersant(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of a dye based colored ink may include from about 1 wt % to about 7 wt % of dye(s), from about 10 wt % to about 30 wt % of co-solvent(s), from about 0.25 wt % to about 2 wt % of dispersant(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water. Some specific examples of suitable colored inks include a set of cyan, magenta, and yellow inks, such as C1893A (cyan), C1984A (magenta), and C1985A (yellow); or C4801A (cyan), C4802A (magenta), and C4803A (yellow); all of which are available from HP Inc. Other commercially available colored inks include C9384A (printhead HP 72), C9383A (printhead HP 72), C4901A (printhead HP 940), and C4900A (printhead HP 940).

Each of the previously described physical elements may be operatively connected to a controller 32 of the printing system 10. The controller 32 may control the operations of the build area platform 12, the build material supply 14, the build material distributor 18, and the inkjet applicator(s) 24A. 24B. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part 48. As such, the controller 32 is depicted as being in communication with a data store 34. The data store 34 may include data pertaining to a 3D part 48 to be printed by the 3D printing system 10. The data for the selective delivery of the polymeric or polymeric composite build material particles 16, the fusing agent 26, the reducing agent 28, etc. may be derived from a model of the 3D part 48 to be formed. For instance, the data may include the locations on each layer of polymeric or polymer composite build material particles 16 that the first inkjet applicator 24A is to deposit the fusing agent 26. In one example, the controller 32 may use the data to control the first inkjet applicator 24A to selectively apply the fusing agent 26. The data store 34 may also include machine readable instructions (stored on a non-transitory computer readable medium) that are to cause the controller 32 to control the amount of polymeric or polymeric composite build material particles 16 that is supplied by the build material supply 14, the movement of the build area platform 12, the movement of the build material distributor 18, the movement of the inkjet applicator(s) 24A, 24B, etc.

As shown in FIG. 1, the printing system 10 may also include a source of electromagnetic radiation 36, 36'. In some examples, the source of electromagnetic radiation 36, 36' may be in a fixed position with respect to the build material platform 12. In other examples, the source of electromagnetic radiation 36, 36' may be positioned to expose the layer of polymeric or polymeric composite build material particles 16 to electromagnetic radiation immediately after the fusing agent 26 has been applied thereto. In the example shown in FIG. 1, the source of electromagnetic radiation 36' is attached to the side of the inkjet applicator(s) 24A, 24B which allows for patterning and heating in a single pass.

The source of electromagnetic radiation 36, 36' may emit electromagnetic radiation having wavelengths ranging from about 800 nm to about 1 mm. As one example, the electromagnetic radiation may range from about 800 nm to about 2 μm. As another example, the electromagnetic radiation may be blackbody radiation with a maximum intensity at a wavelength of about 1100 nm. The source of electromagnetic radiation 36, 36' may be infrared (IR) or near-infrared light sources, such as IR or near-IR curing lamps, IR or near-IR light emitting diodes (LED), or lasers with the desirable IR or near-IR electromagnetic wavelengths.

The source of electromagnetic radiation 36, 36' may be operatively connected to a lamp/laser driver, an input/output temperature controller, and temperature sensors, which are collectively shown as radiation system components 38. The radiation system components 38 may operate together to control the source of electromagnetic radiation 36, 36'. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can provide temperature feedback. The input/output temperature controller may adjust the source of electromagnetic radiation 36, 36' power set points based on any difference between the recipe and the real-time measurements. These power set points are sent to the lamp/laser drivers, which transmit appropriate lamp/laser voltages to the source of electromagnetic radiation 36, 36'. This is one example of the radiation system components 38, and it is to be understood that other radiation source control systems may be used. For example, the controller 32 may be configured to control the source of electromagnetic radiation 36, 36'.

Referring now to FIGS. 2A through 2E, an example of the 3D printing method 100 is depicted. This method 100 may be used to form 3D printed parts having mechanical integrity and being white, off-white, or colored. Throughout the method 100, a single inkjet applicator may be labeled with multiple reference numbers (24A and/or 24B), although it is to be understood that the applicators may be separate applicators or a single applicator with several individual cartridges for dispensing the respective fluids.

Prior to execution of the method 100 or as part of the method 100, the controller 32 may access data stored in the data store 34 pertaining to a 3D part 48 (see, e.g., FIG. 2E) that is to be printed. The controller 32 may determine the number of layers of polymeric or polymeric composite build material 16 that are to be formed, and the locations at which the fusing agent 26 from the applicator 24A is to be deposited on each of the respective layers.

As shown in FIGS. 2A and 2B, the method 100 includes applying the polymeric or polymeric composite build material 16. In FIG. 2A, the build material supply 14 may supply the polymeric or polymeric composite build material particles 16 into a position so that they are ready to be spread onto the build area platform 12. In FIG. 2B, the build material distributor 18 may spread the supplied polymeric or polymeric composite build material particles 16 onto the build area platform 12. The controller 32 may execute control build material supply instructions to control the build material supply 14 to appropriately position the polymeric or polymeric composite build material particles 16, and may execute control spreader instructions to control the build material distributor 18 to spread the supplied polymeric or polymeric composite build material particles 16 over the build area platform 12 to form a layer 40 of polymeric or polymeric composite build material particles 16 thereon. As shown in FIG. 2B, one layer 40 of the polymeric or polymeric composite build material particles 16 has been applied.

The layer 40 has a substantially uniform thickness across the build area platform 12. In an example, the thickness of the layer 40 ranges from about 50 μm to about 300 μm, although thinner or thicker layers may also be used. For example, the thickness of the layer 40 may range from about 20 μm to about 500 μm, or from about 30 μm to about 300 μm. The layer thickness may be about 2× the particle diameter (as shown in FIG. 2B) at a minimum for finer part definition.

Prior to further processing, the layer 40 of the polymeric or polymeric composite build material particles 16 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 350° C. In another example, the pre-heating temperature ranges from about 150° C. to about 170° C.

Pre-heating the layer 40 of the polymeric or polymeric composite build material particles 16 may be accomplished using any suitable heat source that exposes all of the polymeric or polymeric composite build material particles 16 on the build material surface 12 to the heat. Examples of the heat source include a thermal heat source (e.g., a heater (not shown) of the particles 16) or the electromagnetic radiation source 36, 36'.

Referring now to FIG. 2C, after the layer 40 is formed, and in some instances is pre-heated, the fusing agent 26 is selectively applied on a portion 42 of the polymeric or polymeric composite build material 16.

It is to be understood that a single fusing agent 26 may be selectively applied on the portion 42, or multiple fusing agents 26 may be selectively applied on the portion 42. As an example, multiple fusing agents 26 may be used when the colorant is included in at least one of the multiple fusing agents 26 to create a multi-colored part.

As illustrated in FIG. 2C, the fusing agent 26 may be dispensed from the applicator 24A. The controller 32 may execute instructions to control the applicator 24A (e.g., in the directions indicated by the arrow 30) to deposit the fusing agent 26 onto predetermined portion(s) 42 of the polymeric or polymeric composite build material 16 that are to become part of the 3D part 48. The applicator 24A may be programmed to receive commands from the controller 32 and to deposit the fusing agent 26 according to a pattern of a cross-section for the layer of the 3D part 48 that is to be formed. As used herein, the cross-section of the layer of the 3D part 48 to be formed refers to the cross-section that is parallel to the surface of the build area platform 12. In the example shown in FIG. 2C, the applicator 24A selectively applies the fusing agent 26 on those portion(s) 42 of the layer 40 that are to be fused to become the first layer of the 3D part 48. As an example, if the 3D part that is to be formed is to be shaped like a cube or cylinder, the fusing agent 26 will be deposited in a square pattern or a circular pattern (from a top view), respectively, on at least a portion of the layer 40 of the polymeric or polymeric composite build material particles 16. In the example shown in FIG. 2C, the fusing agent 26 is deposited in a square pattern on the portion 42 of the layer 40 and not on the portions 44.

As mentioned above, the fusing agent 26 may include the tetraphenyldiamine-based dye and the FA vehicle. In an example, the fusing agent 26 includes the tetraphenyldiamine-based dye, alkyldiphenyloxide disulfonate, 1-methyl-2-pyrrolidone, and a balance of water. In another example, the fusing agent 26 consists of these components and no other components. In still another example, the fusing agent 26 includes from about 0.5 wt % to about 10 wt % of the tetraphenyldiamine-based dye, from about 0.05 wt % to about 5 wt % of alkyldiphenyloxide disulfonate, from about 5 wt % to about 50 wt % of 1-methyl-2-pyrrolidone, and a balance of water (based on the total wt % of the fusing agent 26). As also mentioned above, in some examples, the fusing agent 26 includes the colorant. In an example, the fusing agent 26 consists of the tetraphenyldiamine-based dye, alkyldiphenyloxide disulfonate, 1-methyl-2-pyrrolidone, the colorant, and a balance of water. In another example, the fusing agent 26 excludes strong reducing species. In still another example, the fusing agent 26 excludes 2-pyrrolidone and/or polyacrylates. In still other examples, the fusing agent 26 excludes the colorant.

The volume of the fusing agent 26 that is applied per unit of the polymeric or polymeric composite build material 16 in the patterned portion 42 may be sufficient to absorb and convert enough electromagnetic radiation so that the polymeric or polymeric composite build material 16 in the patterned portion 42 will fuse. The volume of the fusing agent 26 that is applied per unit of the polymer or polymeric composite build material 16 may depend, at least in part, on the tetraphenyldiamine-based dye used, the tetraphenyldiamine-based dye loading in the fusing agent 26, and the polymeric or polymeric composite build material 16 used.

As shown in FIG. 2D, after applying the fusing agent 26, the entire layer 40 of the polymeric or polymeric composite build material 16 is exposed to electromagnetic radiation (shown as EMR Exposure between FIGS. 2C and 2D).

The electromagnetic radiation is emitted from the source of electromagnetic radiation 36, 36'. The length of time the electromagnetic radiation is applied for, or energy exposure time, may be dependent, for example, on one or more of: characteristics of the electromagnetic radiation 36, 36'; characteristics of the polymeric or polymeric composite build material particles 16; and/or characteristics of the fusing, agent 26.

The fusing agent 26 enhances the absorption of the radiation, converts the absorbed radiation to thermal energy, and promotes the transfer of the thermal heat to the polymeric or polymeric composite build material particles 16 in contact therewith. In an example, the fusing agent 26 sufficiently elevates the temperature of the polymeric or polymeric composite build material particles 16 in layer 40 above the melting or softening point of the particles 16, allowing fusing (e.g., sintering, binding, curing, etc.) of the polymeric or polymeric composite build material particles 16 to take place. Exposure to electromagnetic radiation forms the fused layer 46, as shown in FIG. 2D.

It is to be understood that portions 44 of the polymeric or polymeric composite build material 16 that do not have the fusing agent 26 applied thereto do not absorb enough radiation to fuse. As such, these portions 44 do not become part of the 3D part 48 that is ultimately formed. The polymeric or polymeric composite build material 16 in portions 44 may be reclaimed to be reused as build material in the printing of another 3D part.

The processes shown in FIGS. 2A through 2D may be repeated to iteratively build up several fused layers and to form the 3D printed part 48. FIG. 2D illustrates the initial formation of a second layer of polymeric or polymeric composite build material particles 16 on the previously formed layer 46. In FIG. 2D, following the fusing of the predetermined portion(s) 42 of the layer 40 of polymeric or polymeric composite build material 16, the controller 32 may execute instructions to cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 40. In addition, following the lowering of the build area platform 12, the controller 32 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer with the additional polymeric or polymeric composite build material 16. The newly formed layer may be in some instances preheated, patterned with the fusing agent 26, and then exposed to radiation from the source of electromagnetic radiation 36, 36' to form the additional fused layer.

In some examples, the method 100 may further include applying the reducing agent 28 on the part 48 (shown in FIG. 2E).

It is to be understood that a single reducing agent 28 may be applied on the part 48, or multiple reducing agents 28 may be applied on the part 48. It is also to be understood that the reducing agent 28 may be applied on all or less than all of the part 48. As an example, the reducing agent 28 may be applied on the top of the part 48, but not on the sides or bottom of the part 48. As another example, the reducing agent 28 may be applied on the top and sides of the part 48, but not the bottom of the part 48.

As illustrated in FIG. 2E, the reducing agent 28 may be dispensed from the applicator 24B. The dispensing of the reducing agent 28 from the applicator 24B may be by thermal inkjet printing, or piezoelectric inkjet printing, or continuous inkjet printing. The controller 32 may execute instructions to control the applicator 24B (e.g., in the directions indicated by the arrow 30) to deposit the reducing agent 28 onto the 3D part 48.

While not shown in FIG. 2E, the reducing agent 28 may be applied to the 3D part 48 by other suitable techniques, such as spray coating. In one example, the reducing agent 28 may be prepared with, a high vapor pressure solvent (e.g., isopropyl alcohol, ethanol, acetone, etc.) as the main carrier. The reducing agent 28 may then be passed through a jet nebulizer (i.e., atomizer) at high pressure to create a high velocity mist (or aerosol) consisting of the various reducing agent 28 components, including the reducing species. The mist may be selectively deposited on the 3D part 48 or a portion of the 3D part 48.

The reducing agent 28 may also be applied by dip coating, painting, or any other suitable selective or non-selective coating process. Dip coating may be used, for example, when it is desirable to coat all of the exposed surfaces of the 3D part 48. When the reducing agent 28 is applied by dip coating, the 3D part 48 may be submerged in the reducing agent 28 for an extended time period (e.g., 10 minutes).

In some examples, the reducing agent 28 may be applied at an elevated temperature. When the reducing agent 28 is applied at an elevated temperature, the reducing agent 28 may be heated to the elevated temperature before it is applied to the 3D part 48. The elevated temperature may range from about 30° C. to about 100° C. In an example, the reducing agent 28 is applied at a temperature of about 70° C.

The application of the reducing agent 28 may be accomplished in-line or during the post-processing of the 3D part 48. When the application of the reducing agent 28 is accomplished in-line, the reducing agent 28 is applied before the 3D part 48 is removed from the build area platform 12. When the application of the reducing agent 28 is accomplished during the post-processing of the 3D part 48, the reducing agent 28 is applied after the 3D part 48 is removed from the build area platform 12. In some examples, when the application of the reducing agent 28 is accomplished during the post-processing of the 3D part 48, the reducing agent 28 may be applied after post-printing cleaning. As an example, post-printing cleaning may include removing unfused polymeric or polymeric composite build material particles 16 from the 3D part 48.

As mentioned above, the reducing agent 28 may include the reducing species alone or in combination with the RA vehicle. In an example, the reducing agent 28 includes sodium borohydride, 2-pyrrolidone, sodium hydrosulfite, thiourea dioxide, or a combination thereof. In another example, the reducing agent 28 includes the reducing species and water or an aqueous vehicle (which may include other components in addition to water).

The volume of the reducing agent 28 that is applied per unit of the 3D part 48 may be sufficient to reduce the tetraphenyldiamine-based dye so that the tetraphenyldiamine-based dye does not become photo-oxidized by ambient light, and thus prevents the part 48 from turning green. The volume of the reducing agent 28 that is applied per unit of the 3D part 48 may depend, at least in part, on the tetraphenyldiamine-based dye used, whether a colorant was used in the fusing agent 26, and the polymeric or polymeric composite build material 16 used to create the 3D part 48.

While not shown, the method 100 may further include removing the reducing agent 28 from the 3D part 48. The reducing agent 28 may be wiped off the 3D part 48 or may be washed off the 3D part 48.

If the reducing agent 28 is removed from the 3D part, the method 100 may further include waiting for a time period after applying the reducing agent 28 on the 3D part 48 and before removing the reducing agent 28 from the 3D part. The time period may range from about 5 minutes to about 2 hours. In an example the time period is about 10 minutes.

Figure 4:
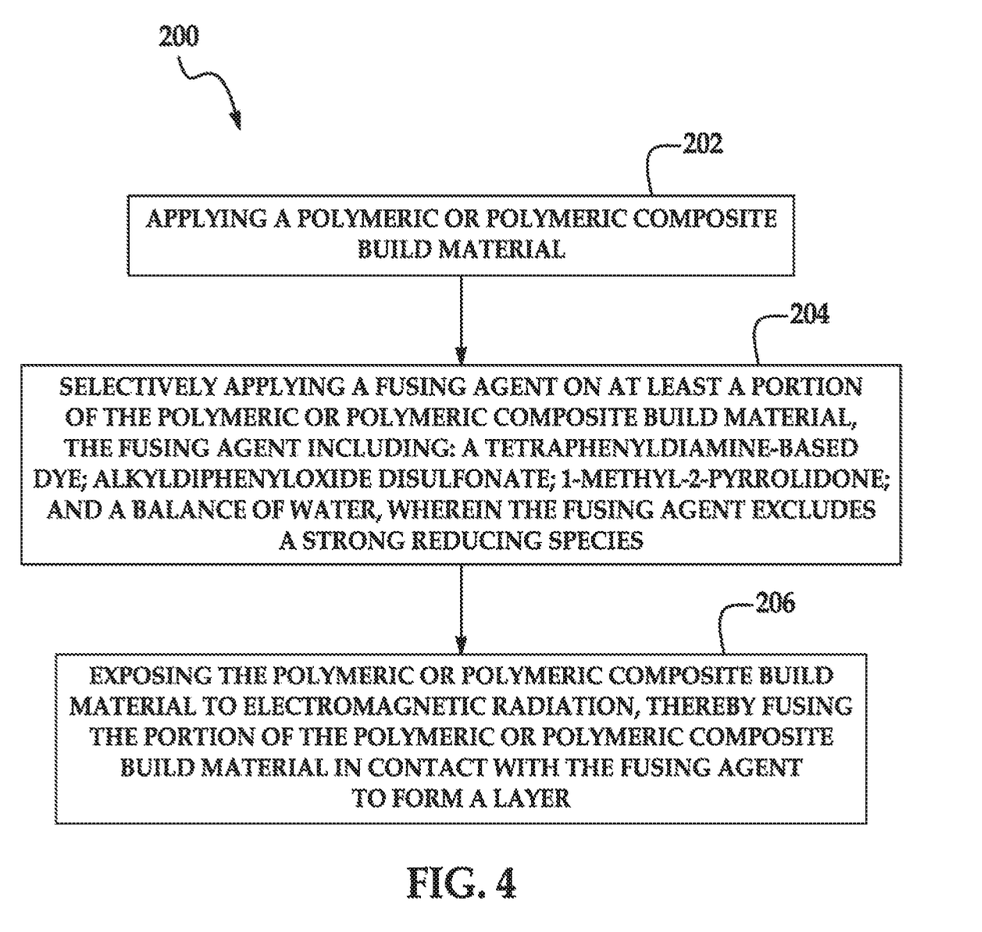
FIG. 4 is a flow diagram illustrating an example of a 3D printing method disclosed herein.

An example of a 3D printing method 200 is depicted in FIG. 4. It is to be understood that examples of the method 200 shown in FIG. 4 are discussed in detail herein, e.g., in FIGS. 2A-2D and the text corresponding thereto.

As shown at reference numeral 202, the method 200 includes applying the polymeric or polymeric composite build material 16.

As shown at reference numeral 204, method 200 further includes selectively applying the fusing agent 26 on at least a portion 42 of the polymeric or polymeric composite build material 16, the fusing agent 26 including: a tetraphenyldiamine-based dye; alkyldiphenyloxide disulfonate; 1-methyl-2-pyrrolidone; and a balance of water, wherein the fusing agent 26 excludes a strong reducing species.

As shown at reference numeral 206, method 200 further includes exposing the polymeric or polymeric composite build material 16 to electromagnetic radiation, thereby fusing the portion 42 of the polymeric or polymeric composite build material 16 in contact with the fusing agent 26 to form the layer 46.

To further illustrate the present disclosure, examples are given herein. It is to be understood that these examples are provided for illustrative purposes and are not to be construed as limiting the scope of the present disclosure.

EXAMPLES

Example 1

An example fusing agent was prepared. The tetraphenyldiamine-based dye used in the example fusing agent composition was tetraphenyldiamine dye. The general formulation of the example fusing agent composition is shown in Table 1, with the wt % of each component that was used.

TABLE 1

| Ingredient | Specific component | Example fusing agent (wt %) |
| --- | --- | --- |
| Co-solvent | 1-methyl-2-pyrrolidone | ~40 |
| Emulsifier | CRODAFOS ® O3A | ~1 |
| Surfactant | SURFYNOL ® SEF | ~1.5 |
|  | CAPSTONE ® FS-35 | ~0.1 |
| Scale inhibitor/ Anti-deceleration agent | DOWFAX ™ 2A1 | ~0.2 |
| Chelating agent | TRILON ® M | ~0.1 |
| Biocide | PROXEL ® GXL | ~0.2 |
| Tetraphenyldiamine-based dye | Tetraphenyldiamine dye | ~3 |
| Water |  | Balance |

A comparative fusing agent was also prepared. Tetraphenyldiamine dye was included in the comparative fusing agent. However, the comparative fusing agent also included 2-pyrrolidone and CARBOSPERSE® K 7028 (i.e., a polyacrylate). The general formulation of the comparative fusing agent composition is shown in Table 2, with the wt % of each component that was used.

TABLE 2

| Ingredient | Specific component | Comparative Fusing agent (wt %) |
| --- | --- | --- |
| Co-solvent | 2-pyrrolidone | ~40 |
| Emulsifier | CRODAFOS ® O3A | ~1 |
| Surfactant | SURFYNOL ® SEF | ~1.5 |
|  | CAPSTONE ® FS-35 | ~0.1 |
| Scale inhibitor | CARBOSPERSE ® K 702B | ~0.02 |
| Chelating agent | TRILON ® M | ~0.1 |
| Biocide | PROXEL ® GXL | ~0.4 |
|  | KORDEK ® MLX | ~0.3 |
| Tetraphenyldiamine-based dye | Tetraphenyldiamine dye | ~3 |
| Water |  | Balance |

The absorbance of each of the example fusing agent and the comparative fusing agent was measured. Then each of the example fusing agent and the comparative fusing agent was heated to and maintained at 60° C. The absorbance of each fusing agent was measure at several points while the fusing agents were maintained at 60° C. (e.g., after 3 hours). The absorbance of the example fusing agent was also measured after it cooled for about 24 hours.

Figure 3A:
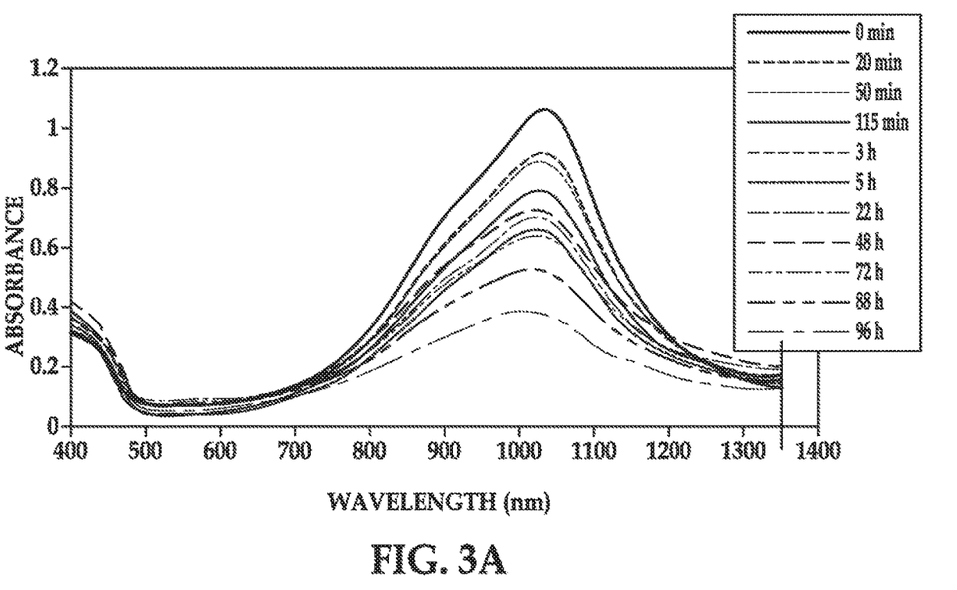
FIGS. 3A and 3B are graphs depicting absorbance (y-axis) versus wavelength (nm, x-axis) of a comparative (FIG. 3A) fusing agent and an example (FIG. 3B) of the fusing agent disclosed herein.
Figure 3B:
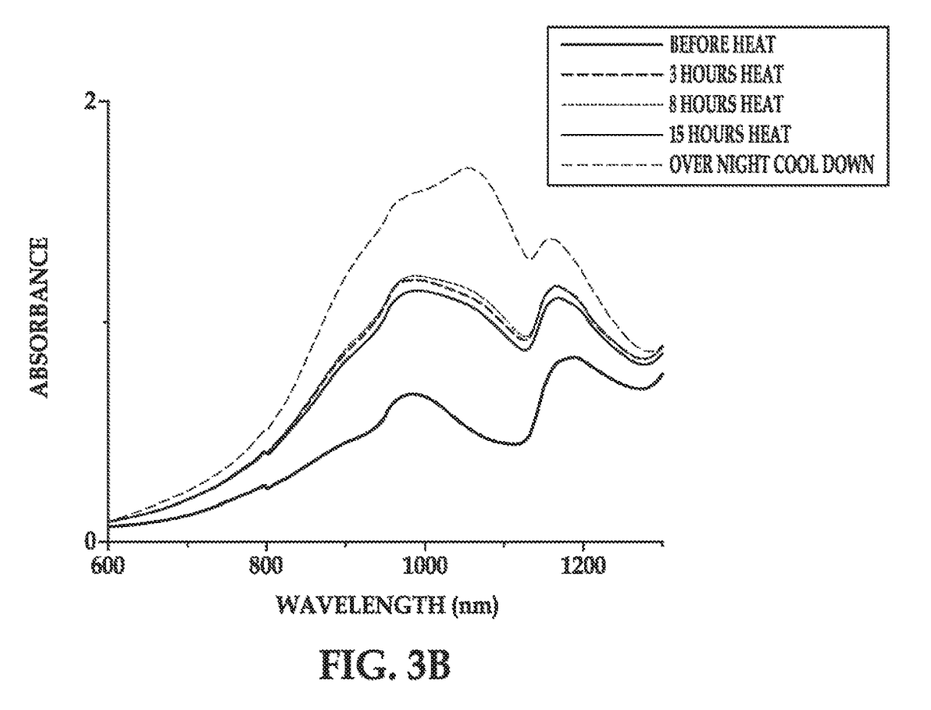

The results of the absorbance measurements are shown in FIGS. 3A and 3B. FIG. 3A shows the absorbance results for the comparative fusing agent, and FIG. 3B shows the absorbance results of the example fusing agent. The absorbance values in arbitrary units (AU) are shown along the Y axis and the wavelength values in nm are shown along the X axis. As shown in FIGS. 3A and 3B, the example fusing agent has increased absorbance as compared to the comparative fusing agent.

Example 2

Two example 3D parts (referred to as "example part 1" and "example part 2") were printed. The build material used to print the example parts was polyamide-12 (PA-12). The fusing agent used to print the example parts was the example fusing agent from example 1.

For each example part, the fusing agent was thermal inkjet printed with a HP761 printhead (manufactured by Hewlett-Packard Company) in a pattern on a portion of the PA-12 in subsequent layers. Each layer was about 100 μm in thickness. New layers were spread onto the fabrication bed from a supply region using a roller. The temperature of the supply region was set at 100° C. The temperature of the printing region was set at 155° C. with a platen underneath it heated to 150° C. The example parts were printed at a contone level less than 60 contone (which refers to the number of drops, which is divided by 256, that will be placed on average onto each pixel). The example parts were then exposed to high-intensity light from two sets of two 650 watt halogen bulbs passing over the fabrication bed. After all layers were printed, the example parts were removed from the fabrication bed and sandblasted to remove excess powder.

Immediately after post-printing cleaning, both example part 1 and example part 2 were the off-white color of the PA-12 build material. A reducing, agent was not applied to example part 1. Example part 2 was treated in 2-pyrrolidone at 70° C. for 10 minutes immediately after post-printing cleaning. Both example parts were placed under ambient light. After 1 day under ambient light, example part 1 turned light green in color. After 14 days under ambient light, example part 2, maintained the off-white color of the PA-12 build material.

It is to be understood that the ranges provided herein include the stated range and any value or sub-range within the stated range. For example, a range from about 0.5 wt % to about 10 wt % should be interpreted to include not only the explicitly recited limits of from about 0.5 wt % to about 10 wt %, but also to include individual values, such as 0.55 wt %, 3.35 wt %, 5.5 wt %, 7.75 wt %, 8.85 wt %, etc., and sub-ranges, such as from about 3.35 wt % to about 6.5 wt %, from about 2.5 wt % to about 7.7 wt %, etc. Furthermore, when "about" or the symbol "~" is utilized to describe a value, this is meant to encompass minor variations (up to +/−15%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A fusing agent, comprising:
a tetraphenyldiamine-based dye;
alkyldiphenyloxide disulfonate;
1-methyl-2-pyrrolidone; and
water;
wherein the fusing agent excludes a strong reducing species, and wherein the strong reducing species excluded from the fusing agent is an agent that can reduce the dye to its leuco form and render the dye non-absorbing of wavelengths ranging from 800 nm to 1200 nm.

2. A fusing agent, comprising:
a tetraphenyldiamine-based dye;
alkyldiphenyloxide disulfonate;
1-methyl-2-pyrrolidone; and
water;
wherein the fusing agent excludes a strong reducing species, and wherein the strong reducing species excluded from the fusing agent is a polyacrylate, 2-pyrrolidone, or a combination thereof.

3. The fusing agent as defined in claim 1, further comprising a colorant.

4. The fusing agent as defined in claim 1, further comprising an additive selected from the group consisting of a surfactant, an emulsifier, a chelating agent, an antimicrobial agent, and a combination thereof.

5. The fusing agent as defined in claim 1 wherein:
the tetraphenyldiamine-based dye is present in an amount ranging from about 0.5 wt % to about 10 wt % based on a total wt % of the fusing agent;
the alkyldiphenyloxide disulfonate is present in an amount ranging from about 0.05 wt % to about 5 wt % based on the total wt % of the fusing agent; and
1-methyl-2-pyrrolidone is present in an amount ranging from about 5 wt % to about 50 wt % based on the total wt % of the fusing agent.

6. A three-dimensional (3D) printing method, comprising:
applying a polymeric or polymeric composite build material;
selectively applying a fusing agent on at least a portion of the polymeric or polymeric composite build material, the fusing agent including:
a tetraphenyldiamine-based dye;
alkyldiphenyloxide disulfonate;
1-methyl-2-pyrrolidone; and
water;
wherein the fusing agent excludes a strong reducing species, and wherein the strong reducing species excluded from the fusing agent is an agent that can reduce the dye to its leuco form and render the dye non-absorbing of wavelengths ranging from 800 nm to 1200 nm; and
exposing the polymeric or polymeric composite build material to electromagnetic radiation, thereby fusing the portion of the polymeric or polymeric composite build material in contact with the fusing agent to form a layer.

7. A three-dimensional (3D) printing method, comprising:
applying a polymeric or polymeric composite build material;
selectively applying a fusing agent on at least a portion of the polymeric or polymeric composite build material, the fusing agent including:
a tetraphenyldiamine-based dye;
alkyldiphenyloxide disulfonate;
1-methyl-2-pyrrolidone; and
water;
wherein the fusing agent excludes a strong reducing species; and
exposing the polymeric or polymeric composite build material to electromagnetic radiation, thereby fusing the portion of the polymeric or polymeric composite build material in contact with the fusing agent to form a layer;
wherein the strong reducing species excluded from the fusing agent is a polyacrylate, 2-pyrrolidone, or a combination thereof.

8. The method as defined in claim 6 wherein:
the tetraphenyldiamine-based dye is present in an amount ranging from about 0.5 wt % to about 10 wt % based on a total wt % of the fusing agent;
the alkyldiphenyloxide disulfonate is present in an amount ranging from about 0.05 wt % to about 5 wt % based on the total wt % of the fusing agent; and
1-methyl-2-pyrrolidone is present in an amount ranging from about 5 wt % to about 50 wt % based on the total wt % of the fusing agent.

9. The method as defined in claim 6, further comprising:
repeating the applying of the polymeric or polymeric composite build material, the selectively applying of the fusing agent, and the exposing of the polymeric or polymeric composite build material to electromagnetic radiation to iteratively build up multiple layers and form a part;
applying a reducing agent on the part.

10. The method as defined in claim 9 wherein the reducing agent is selected from the group consisting of sodium borohydride, 2-pyrrolidone, sodium hydrosulfite, thiourea dioxide, and a combination thereof.

11. The method as defined in claim 10 wherein the applying of the reducing agent is accomplished by thermal inkjet printing, or piezoelectric inkjet printing, or continuous inkjet printing.

12. The method as defined in claim 11 wherein the reducing agent further includes an aqueous vehicle.

13. The method as defined in claim 9 wherein one of:
the applying of the reducing agent on the part is accomplished in-line; or
the applying of the reducing agent on the part is accomplished during post-processing.

14. A three-dimensional (3D) printing system, comprising:
a supply of polymeric or polymeric composite build material;
a build material distributor;
a supply of a fusing agent, the fusing agent including:
a tetraphenyldiamine-based dye;
alkyldiphenyloxide disulfonate;
1-methyl-2-pyrrolidone; and
water;
wherein the fusing agent excludes a strong reducing species, and wherein the strong reducing species excluded from the fusing agent is an agent that can reduce the dye to its leuco form and render the dye non-absorbing of wavelengths ranging from 800 nm to 1200 nm;
an inkjet applicator for selectively dispensing the fusing agent;
a source of electromagnetic radiation;
a controller; and
a non-transitory computer readable medium having stored thereon computer executable instructions to cause the controller to:
utilize the build material distributor to dispense the polymeric or polymeric composite build material;
utilize the inkjet applicator to selectively dispense the fusing agent on at least a portion of the polymeric or polymeric composite build material; and
utilize the source of electromagnetic radiation to expose the polymeric or polymeric composite build material to electromagnetic radiation, thereby fusing the portion of the polymeric or polymeric composite build material in contact with the fusing agent to form a layer.

15. The system as defined in claim 14, further comprising:
a supply of a reducing agent; and
a second inkjet applicator for selectively dispensing the reducing agent;
wherein the computer executable instructions further cause the controller to utilize the second inkjet applicator to selectively dispense the reducing agent on a three-dimensional part including the layer.

\* \* \* \* \*